United States Patent
Chen et al.

(10) Patent No.: US 9,252,927 B2
(45) Date of Patent: Feb. 2, 2016

(54) SIGNALING PROCESSING METHOD, BASE STATION, AND USER EQUIPMENT

(75) Inventors: Xiaobo Chen, Beijing (CN); Ruina Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 822 days.

(21) Appl. No.: 13/421,535

(22) Filed: Mar. 15, 2012

(65) Prior Publication Data
US 2012/0176991 A1  Jul. 12, 2012

Related U.S. Application Data

(63) Continuation of application No. PCT/CN2010/076934, filed on Sep. 15, 2010.

(30) Foreign Application Priority Data

Sep. 15, 2009 (CN) .......................... 2009 1 0092683

(51) Int. Cl.
*H04W 4/00* (2009.01)
*H04L 1/18* (2006.01)

(52) U.S. Cl.
CPC ............ *H04L 1/1854* (2013.01); *H04L 1/1861* (2013.01); *H04L 1/1893* (2013.01)

(58) Field of Classification Search
CPC ..... H04W 72/04; H04W 88/08; H04W 76/00; H04W 84/08; H04W 76/02; H04W 84/12; H04W 74/0816; H04W 74/04; H04W 72/0406; H04W 80/04; H04W 8/26; H04W 28/26; H04W 72/0446; H04L 5/003; H04J 3/1694

USPC .......... 370/329, 341, 348, 349, 431, 443, 458
See application file for complete search history.

(56) References Cited

U.S. PATENT DOCUMENTS

| | | | |
|---|---|---|---|
| 2010/0254329 A1* | 10/2010 | Pan et al. ...................... | 370/329 |
| 2011/0096745 A1* | 4/2011 | Ahn et al. ..................... | 370/329 |
| 2011/0128922 A1* | 6/2011 | Chen et al. ................... | 370/329 |

FOREIGN PATENT DOCUMENTS

| | | |
|---|---|---|
| CN | 101409922 A | 4/2009 |
| CN | 101488832 A | 7/2009 |

(Continued)

OTHER PUBLICATIONS

Written Opinion of the International Searching Authority in corresponding International Patent Application No. PCT/CN2010/076934 (Dec. 23, 2010).

(Continued)

*Primary Examiner* — Brenda H Pham
(74) *Attorney, Agent, or Firm* — Leydig, Voit & Mayer, Ltd.

(57) ABSTRACT

Embodiments of the present invention disclose a signaling processing method. The method includes: in a downlink subframe set, generating a downlink assignment index (DAI) respectively for a downlink subframe that has a physical downlink control channel (PDCCH) to be sent, where a value of the DAI is generated according to a preset rule and a sequence of carrier first and then subframe; and sending the PDCCH to the user equipment, where the PDCCH carries the DAI. According to the embodiments of the present invention, a transmission delay is shortened and transmission efficiency is improved.

18 Claims, 4 Drawing Sheets

(56) References Cited

FOREIGN PATENT DOCUMENTS

| CN | 101505498 A | 8/2009 |
|---|---|---|
| CN | 101790240 A | 7/2010 |

OTHER PUBLICATIONS

1st Office Action in corresponding Chinese Patent Application No. 200910092683.7 (Jul. 20, 2012).

Extended European Search Report in corresponding European Patent Application No. 10816697.6 (Sep. 7, 2012).

"TS 36.212—3rd Generation Partnership Project; Technical Specification Group Radio Access Network; Evolved Universal Terrestrial Radio Access (E-UTRA); Multiplexing and Channel Coding (Release 8)," 3GPP Technical Specification, May 2009, V8.7.0, 3GPP, Valbonne, France.

International Search Report in corresponding PCT Application No. PCT/CN2010/076934 (Dec. 23, 2010).

"R1-082615—DAI Design for TDD configuration #5 (9:1) in ACK/NACK Bundling," 3GPP TSG RAN WG1 Meeting #53 BIS, Jun. 30-Jul. 4, 2008, 3rd Generation Partnership Project, Valbonne, France.

2nd Office in corresponding Chinese Patent Application No. 2009100926837 (Feb. 5, 2013).

"3GPP TS 36.213—3rd Generation Partnership Project; Technical Specification Group Radio Access Network; Evolved Universal Terrestrial Radio Access (E-UTRA); Physical Layer Procedures (Release 8)," May 2009, Version 8.7.0, 3rd Generation Partnership Project, Valbonne, France.

* cited by examiner

SIGNALING PROCESSING METHOD, BASE STATION, AND USER EQUIPMENT

CROSS-REFERENCE TO RELATED APPLICATIONS

This application is a continuation of International Application No. PCT/CN2010/076934, filed on Sep. 15, 2010, which claims priority to Chinese Patent Application No. 200910092683.7, filed on Sep. 15, 2009, both of which are hereby incorporated by reference in their entireties.

FIELD OF THE INVENTION

The present invention relates to the field of wireless communication technologies, and in particular, to a signaling processing method, a base station, and a user equipment.

BACKGROUND OF THE INVENTION

In a long term evolution (Long Term Evolution, hereinafter referred to as LTE) time division duplex (Time Division Duplex, hereinafter referred to as TDD) system, one uplink subframe needs to feed back response information of multiple downlink subframes. An acknowledgement (ACK, Acknowledgement) indicates that a UE correctly receives a corresponding transmission block transmitted on a corresponding physical downlink shared channel (Physical Downlink Shared Channel, hereinafter referred to as PDSCH). A negative acknowledgement (NACK, Negative Acknowledgement) indicates that a UE incorrectly receives a corresponding transmission block transmitted on a corresponding PDSCH. Discontinuous transmission (DTX, Discontinuous Transmission) indicates that a UE does not receive a corresponding transmission block transmitted on a corresponding PDSCH. In the LTE TDD system, modes for transmitting the response information of multiple downlink subframes in one uplink subframe may include a bundling mode and a multiplexing mode. In the LTE TDD system, a downlink assignment index (DAI, downlink assignment index) needs to be used to indicate scheduling information of the downlink subframes. The DAI is 2-bit information carried in downlink control information (DCI, downlink control information).

A DAI mechanism of the LTE TDD system is directly introduced into a long term evolution-advanced (Long Term Evolution-Advanced, LTE-A) system. Each carrier uses an independent DAI for counting, and bundled response information is transmitted on a physical uplink control channel (Physical Uplink Control Channel, hereinafter referred to as PUCCH) resource. The PUCCH resource is obtained according to a control channel element (CCE, Control Channel Element) with a minimum number on a physical downlink control channel (PDCCH, Physical Downlink Control Channel). The PDCCH is the PDCCH corresponding to a last downlink subframe received by the UE on multiple carriers. However, the PDCCH may not be a last PDCCH sent by the base station to the UE. The DAI cannot be used to detect whether another PDCCH is lost after the UE receives the PDCCH. Consequently, a mistake that the DTX is determined as an ACK may be caused, and the mistake can only be rectified by upper-layer retransmission. This prolongs a transmission delay of data sent by the base station to the UE, and reduces transmission efficiency.

SUMMARY OF THE INVENTION

Embodiments of the present invention provide a signaling processing method, a base station, and a user equipment to solve the problem that a transmission delay is prolonged and that transmission efficiency is low.

An embodiment of the present invention provides a signaling processing method, including:

in a downlink subframe set, generating, by a base station, a downlink assignment index (DAI) respectively for a downlink subframe that has a physical downlink control channel (PDCCH) to be sent, where a value of the DAI is generated according to a preset rule and a sequence of carrier first and then subframe; and sending, by the base station, the PDCCH to a user equipment, where the PDCCH carries the DAI.

An embodiment of the present invention provides another signaling processing method, including:

receiving, by a user equipment (UE), a physical downlink control channel (PDCCH) sent by a base station, where the PDCCH carries a downlink assignment index (DAI), and a value of the DAI is generated according to a preset rule and a sequence of carrier first and then subframe;

obtaining, by the UE, the total number $U_{DAI}$ of received PDCCHs, and obtaining a value $V_{DAI}^{DL}$ of a DAI on a last PDCCH among the received PDCCHs; and sending, by the UE, response information to the base station on a corresponding physical uplink channel of the UE according to the total number $U_{DAI}$ of PDCCHs and the value $V_{DAI}^{DL}$ of the DAI on the last PDCCH.

An embodiment of the present invention provides a base station, including:

a generating module, configured to generate, in a downlink subframe set, a downlink assignment index (DAI) respectively for a downlink subframe that has a physical downlink control channel (PDCCH) to be sent, where a value of the DAI is generated according to a preset rule and a sequence of carrier first and then subframe; and a transmitter, configured to send the PDCCH to a user equipment, where the PDCCH carries the DAI.

An embodiment of the present invention further provides a user equipment, including:

a receiver, configured to receive a physical downlink control channel (PDCCH) sent by a base station, where the PDCCH carries a downlink assignment index (DAI), and a value of the DAI is generated according to a preset rule and a sequence of carrier first and then subframe;

a obtaining module, configured to obtain the total number $U_{DAI}$ of received PDCCHs, and obtain a value $V_{DAI}^{DL}$ of a DAI on a last PDCCH among the received PDCCHs; and a feedback module, configured to send response information to the base station on a corresponding physical uplink channel according to the total number $U_{DAI}$ of PDCCHs and the value $V_{DAI}^{DL}$ of the DAI on the last PDCCH.

According to the foregoing embodiments of the present invention, for a downlink subframe that has a PDCCH to be sent, a value of a DAI is determined for the PDCCH. The value of the DAI is generated according to the preset rule and the sequence of carrier first and then subframe. The base station can obtain the number of downlink subframes which have PDCCHs to be sent and are before each downlink subframe that carries the PDCCH. In this way, no matter whether the UE detects all PDCCHs sent by the base station or the UE does not detect one or multiple PDCCHs, the base station does not mistakenly determine DTX as an ACK, which reduces the transmission delay and improves the transmission efficiency.

DETAILED DESCRIPTION OF THE EMBODIMENTS

Figure 1:
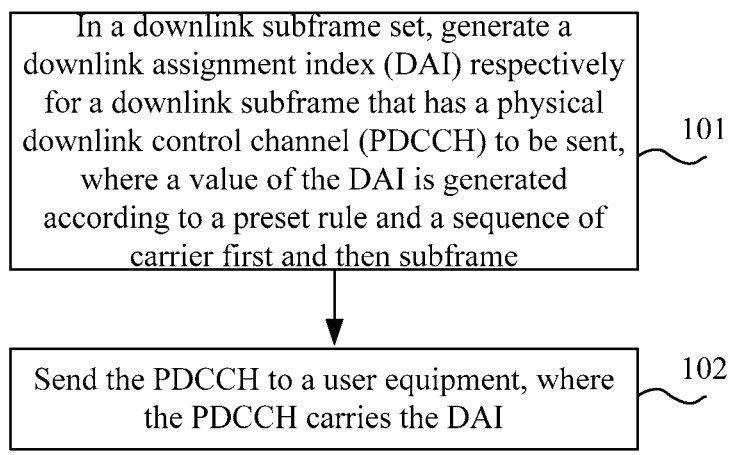
FIG. 1 is a flowchart of an embodiment of a signaling processing method according to the present invention.

The technical solutions disclosed in the embodiments of the present invention are clearly and completely described below with reference to the accompanying drawings in the embodiments of the present invention. Evidently, the embodiments to be described are only part of rather than all of the embodiments of the present invention. Based on the embodiments of the present invention, all other embodiments obtained by persons of ordinary skill in the art without making creative efforts shall fall within the protection scope of the present invention.

An LTE-A (Long Term Evolution-Advanced, hereinafter referred to as LTE-A) system needs to support a wider bandwidth than an LTE system. Therefore, multiple carriers may be aggregated. Resources on the aggregated carriers may be concurrently scheduled for a UE for using.

Table 1 is a mapping table of values of a DAI. As shown in Table 1, the first column lists a 2-bit DAI, where an MSB is a most significant bit and an LSB is a least significant bit. According to a ratio of an uplink subframe to a downlink subframe, response information of multiple downlink subframes is transmitted in a same uplink subframe. In the second column, $V_{DAI}^{UL}$ indicates the total number of physical downlink shared channels (Physical Downlink Shared Channel, hereinafter referred to as PDSCH) scheduled for a user in multiple downlink subframes, and $V_{DAI}^{DL}$ indicates a value of a DAI in a last downlink subframe that is allocated a corresponding physical downlink control channel (Physical Downlink Control Channel, hereinafter referred to as PDCCH) resource among PDSCHs detected by a user equipment (User Equipment, hereinafter referred to as UE). The third column indicates the number of downlink subframes which have PDSCHs to be transmitted and are among the downlink subframes whose response information is to be transmitted in an uplink subframe. For example, in an LTE TDD system, if response information of M downlink subframes is transmitted in an uplink subframe, L indicates an accumulated value of any subframe that has the PDCCH and a subframe which is before the subframe and has a PDCCH allocated resource among the M downlink subframes (corresponding to the value in the 3$^{rd}$ column in Table 1). The value of the DAI is (L−1)mod 4+1.

1.

TABLE 1

| DAI<br>MSB (Most Significant Bit),<br>LSB (Least Significant Bit) | $V_{DAI}^{UL}$ or $V_{DAI}^{DL}$ | The Number of Subframes<br>That Have a PDSCH<br>to Be Transmitted |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

When transmitting response information in a bundling mode, the UE may count the detected downlink subframes that have the PDCCH to be sent to obtain the total number $U_{DAI}$ of downlink subframes that have the PDCCH to be sent. The UE may also detect the value $V_{DAI}^{DL}$ of the DAI in the last downlink subframe that has the PDCCH to be sent. If $U_{DAI}>0$, and $V_{DAI}^{DL} \neq (U_{DAI}-1)\mathrm{mod}\ 4+1$, the UE may detect that at least one PDCCH of the downlink subframes is lost, and the response information of at least one downlink subframe is DTX. In this case, the UE does not feed back response information to a base station and feeds back the response information in a last subframe because the bundling mode is used. For a last PDCCH received by the UE, through the foregoing DAI procedure, it may be detected whether any PDCCH is lost before the last PDCCH. However, the last PDCCH received by the UE may not be a last PDCCH sent by the base station to the UE. In this case, through the foregoing DAI procedure, it cannot be detected whether the at least one last PDCCH sent by the base station is lost. When detecting, according to the value of the DAI, that no PDCCH is lost, the UE may use the bundling mode to send bundled response information on a physical uplink control channel (Physical Uplink Control Channel, hereinafter referred to as PUCCH) corresponding to a control channel element (control channel element, hereinafter referred to as CCE) with a minimum number of the PDCCH in the detected last downlink subframe.

The LTE-A system directly introduces a DAI mechanism in the LTE TDD system. Each carrier uses an independent DAI for counting, and the bundled response information is transmitted on a PUCCH resource corresponding to the CCE with the minimum number of the last PDCCH received by multiple carriers. However, the last PDCCH received by the UE may not be the last PDCCH sent by the base station to the UE. Through the DAI procedure, whether another PDCCH is lost cannot be detected after the UE receives the PDCCH. Consequently, a mistake that the DTX is determined as an ACK may be caused, and the mistake can only be rectified by upper-layer retransmission. This prolongs a transmission delay of the user, and reduces transmission efficiency.

To solve the foregoing technical problems, embodiments of the present invention provide a signaling processing method. To make the objectives, technical solutions, and merits of the present invention clearer, the following further describes the technical solutions disclosed in the present invention in detail with reference to the accompanying drawings and embodiments.

FIG. 1 is a flowchart of an embodiment of a signaling processing method according to the present invention. As shown in FIG. 1, the method in this embodiment may include:

Step 101: In a downlink subframe set, generate a downlink assignment index (DAI) respectively for a downlink subframe that has a physical downlink control channel (PDCCH) to be sent, where a value of the DAI is generated according to a preset rule and a sequence of carrier first and then subframe.

A UE needs to feed back response information for downlink data sent in a downlink subframe by a base station on a physical downlink shared channel, and time when the response information is fed back has a system-predefined delay against time when the physical downlink control channel is sent. In an LTE-A TDD system, all downlink subframes of all component carriers, where response information of all downlink subframes is fed back at same uplink time according to the system-predefined delay, form one or multiple downlink subframe sets. At uplink time, when the user equipment sends all response information on a same physical uplink channel, a downlink subframe set is formed; when the user equipment sends different response information on different physical uplink channels, multiple downlink subframe sets are formed, where each downlink subframe set is formed by downlink subframes whose response information is sent on the same physical uplink channel. The downlink subframe set includes the downlink subframes of all component carriers, where response information of the downlink subframes is sent on the same physical uplink channel. The physical uplink channel may include a physical downlink control channel (PUCCH) or a physical downlink shared channel (PUSCH). When the response information of the downlink subframe set is transmitted on the same physical uplink channel, the same physical uplink channel may include one or multiple channels according to whether a PUCCH transmit diversity technology is used.

The PDCCH may be used to allocate resources to the PDSCH or indicate release of the PDSCH resources allocated for downlink semi-static scheduling.

Assuming that the downlink subframe set includes downlink subframes of I component carriers and that the $i^{th}$ component carrier has $J_i$ downlink subframes, the sequence of carrier first and then subframe refers to, in the downlink subframe set, generating DAI values for downlink subframes in all component carriers at downlink subframe time, and then generating DAI values for downlink subframes in all component carriers at next downlink subframe time, and the rest may be deduced by analogy. The DAI values for the downlink subframes in all component carriers at the downlink subframe time may be generated according to any sequence. For ease of operation, the DAI values may be generated according to an ascending order or descending order of numbers of the component carriers where the downlink subframes are located. For example, in the downlink subframe set, a value of a DAI corresponding to a downlink subframe $Q_{ij}$ that has a PDCCH to be sent may be obtained by mapping the number $L_{ij}$ of downlink subframes. $L_{ij}$ indicates the number of subframes, where the number of subframes is obtained by accumulatively counting, according to the sequence of carrier first and then subframe, downlink subframes which have the PDCCHs to be sent and are among the $j^{th}$ downlink subframe $Q_{ij}$ in the $i^{th}$ carrier and downlink subframes before the downlink subframe $Q_{ij}$, and $$I \geq 1, 1 \leq i \leq I, 1 \leq j \leq J_i, K \leq \sum_{i=1}^{I} J_i.$$

The number of downlink subframes in each component carrier may be the same, and may also be different. The following description is based on the case where the number J of downlink subframes in each component carriers is the same.

For example, Table 2 is a value comparison table for a downlink subframe set.
2.

TABLE 2

| Component Carrier Number | Subframe Number | | | |
|---|---|---|---|---|
| | 1 | 2 | 3 | 4 |
| 1 | 1 | 3 | 1 | |
| 2 | 2 | 4 | 2 | |

As shown in Table 2, in an LTE-A system, the number of aggregated component carriers is 2, and each component carrier has four downlink subframes, namely, a corresponding downlink subframe set includes eight downlink subframes. During transmission by using a bundling mode, response information of downlink subframes in two component carriers is transmitted on a same physical uplink channel, for example, a PUCCH. In the downlink subframe set, six downlink subframes Q have the PDCCH to be sent, namely $Q_{11}$, $Q_{21}$, $Q_{12}$, $Q_{22}$, $Q_{13}$, and $Q_{23}$. The PDCCH is used to allocate resources to the PDSCH or indicate release of the PDSCH resources allocated for downlink semi-static scheduling. During transmission by using the bundling mode, the value of the DAI of the downlink subframe that has the PDCCH to be sent needs to be determined. In this embodiment, the base station may map, according to a preset rule, the number $L_{ij}$ of subframes into the DAI value $X_{ij}$ of the downlink subframe $Q_{ij}$, where $1 \leq i \leq 2$, $1 \leq j \leq 4$, and the number $L_{ij}$ of subframes is obtained by accumulatively counting, according to the sequence of carrier first and then subframe, downlink subframes which have the PDCCHs to be sent and are among the downlink subframes whose response information is sent on the same physical uplink channel. In this embodiment, the sequence of first carrier and then subframe may be {carrier 1 subframe 1, carrier 2 subframe 1, carrier 1 subframe 2, carrier 2 subframe 2, carrier 1 subframe 3, carrier 2 subframe 3, carrier 1 subframe 4, carrier 2 subframe 4}. The downlink subframes that have the PDCCH to be sent may be in a sequence of {carrier 1 subframe 1, carrier 2 subframe 1, carrier 1 subframe 2, carrier 2 subframe 2, carrier 1 subframe 3, carrier 2 subframe 3}, namely, corresponding to $Q_{11}$, $Q_{21}$, $Q_{12}$, $Q_{22}$, $Q_{13}$ and $Q_{23}$. $L_{11}$ corresponding to $Q_{11}$ is 1, $L_{21}$ corresponding to $Q_{21}$ is 2, $L_{12}$ corresponding to $Q_{12}$ is 3, $L_{22}$ corresponding to $Q_{22}$ is 4, $L_{13}$ corresponding to $Q^{13}$ is 5, and $L_{23}$ corresponding to $Q_{23}$ is 6. In this embodiment, the preset rule may be $X_{ij}=(L_{ij}-1) \bmod n+1$, where $n=2^x$, and x is the number of bits of the DAI, for example x=2. Therefore, the DAI value for $Q_{11}$ is 1, the DAI value for $Q_{21}$ is 2, the DAI value for $Q_{12}$ is 3, the DAI value for $Q_{22}$ is 4, the DAI value $Q_{13}$ is 1, and the DAI value for $Q_{23}$ is 2.

The generating the value of the DAI according to the preset rule and the sequence of carrier first and then subframe in step 101 may include:

According to a first value-obtaining rule, the DAI value of the downlink subframe that has the PDCCH to be sent is obtained by accumulatively counting, according to the sequence of carrier first and then subframe, downlink subframes which have the PDCCHs to be sent and are among a current downlink subframe in a current carrier and downlink subframes before the current downlink subframe. Specifically, the formula (1) may be used to map $L_{ij}$ to obtain the DAI value $X_{ij}$.

$$X_{ij}=(L_{ij}-1) \bmod n+1 \qquad (1)$$

$L_{ij}$ indicates the number of subframes, where the number of subframes is obtained by accumulatively counting, according to the sequence of carrier first and then subframe, downlink subframes which have the PDCCHs to be sent and are among the $j^{th}$ downlink subframe $Q_{ij}$ in in the $i^{th}$ carrier and the downlink subframes before the downlink subframe $Q_{ij}$, where $n=2^x$, and x is the number of bits of the DAI.

Alternatively, the generating the value of the DAI according to the preset rule and the sequence of carrier first and then subframe in step 101 may include:

According to a second value-obtaining rule, the DAI value of the downlink subframe that has the PDCCH to be sent is obtained by accumulatively counting, according to the sequence of carrier first and then subframe, downlink subframes which have the PDCCHs to be sent and are among a current downlink subframe in a current carrier and downlink subframes before the current downlink subframe, and the DAI values of the last two downlink subframes that have the PDCCH to be sent are the same. Specifically, if after the $j^{th}$ downlink subframe in the $i^{th}$ carrier, a downlink subframe that has the PDCCH to be sent exists, the formula (2) may be used to map $L_{ij}$ to obtain the DAI value $X_{ij}$.

$$X_{ij}=L_{ij} \bmod n+1 \quad (2)$$

If after the $j^{th}$ downlink subframe in the $i^{th}$ carrier, a downlink subframe that has the PDCCH to be sent does not exist, the formula (1) may be used to map $L_{ij}$ to obtain the DAI value $X_{ij}$.

$$X_{ij}=(L_{ij}-1) \bmod n+1 \quad (1)$$

$L_{ij}$ indicates the number of subframes, where the number of subframes is obtained by accumulatively, according to the sequence of carrier first and then subframe, counting downlink subframes which have the PDCCHs to be sent and are among the $j^{th}$ downlink subframe $Q_{ij}$ in in the $i^{th}$ carrier and the downlink subframes before the downlink subframe $Q_{ij}$, where $n=2^x$, and x is the number of bits of the DAI.

Alternatively, the generating the value of the DAI according to the preset rule and the sequence of carrier first and then subframe in step 101 may include:

According to a third value-obtaining rule, the DAI value of the downlink subframe that has the PDCCH to be sent is set to a value obtained by accumulatively counting, according to the sequence of carrier first and then subframe, downlink subframes which have the PDCCHs to be sent and are in all carriers at the time of the current and previous downlink subframes. Specifically, the formula (3) may be used to map $L^{ij}$ to obtain the DAI value $X_{ij}$.

$$X_{ij}=(\max\{l_{ij}, i=1, \ldots, I\}-1) \bmod n+1 \quad (3)$$

$L_{ij}$ indicates the number of subframes, where the number of subframes is obtained by accumulatively counting, according to the sequence of carrier first and then subframe, downlink subframes which have the PDCCHs to be sent and are among the $j^{th}$ downlink subframe $Q_{ij}$ in the $i^{th}$ carrier and the downlink subframes before the downlink subframe $Q_{ij}$, where $n=2^x$, and x is the number of bits of the DAI.

A person skilled in the art may understand that other preset rules may also be used for generating the DAI by mapping, and implementation principles of generating the DAI by using other preset rules are the same, which are not repeatedly described here.

Step 102: Send the PDCCH to the user equipment, where the PDCCH carries the DAI.

The base station may send PDCCHs to the UE, and these PDCCHs carry the DAI generated by mapping. Carrying the DAI may refer to representing the DAI by using x bits of information in the DCI, or, after a cyclic redundancy check (Cyclic Redundancy Check, hereinafter referred to as CRC) is added in the DCI, performing scrambling for the CRC by using the DAI, and then sending the DCI carrying the DAI information on the downlink control channel.

The UE may receive the PDCCH sent by the base station, and accumulatively count the received PDCCHs to obtain the total number $U_{DAI}$ of PDCCHs. In addition, the UE may obtain the value $V_{DAI}^{DL}$ of the DAI on the last PDCCH among the received PDCCHs. The UE may detect, according to the $V_{DAI}^{DL}$ and the $U_{DAI}$, whether a PDCCH is lost during receiving the PDCCHs, and feeds back response information to the base station according to a detection result. Further, if $U^{DAI}$ is greater than 0 and different from the number of subframes indicated by $V_{DAI}^{DL}$, namely, $U_{DAI}>0$ and DAI $V_{DAI}^{DL} \neq$ ($U_{DAI}-1$)mod n+1, the UE detects that at least one PDCCH of the downlink subframes is lost; if $U_{DAI}$ is greater than 0 and equal to the number of subframes indicated by $V_{DAI}^{DL}$, namely, $U_{DAI}>0$ and $V_{DAI}^{DL}=(U_{DAI}-1) \bmod n+1$, the UE detects that no PDCCH is lost. When the UE detects that at least one PDCCH of the downlink subframes is lost, if the physical uplink channel is not a PUSCH but a PUCCH, the UE does not feed back response information to the base station; if the physical uplink channel is a PUSCH, the UE feeds back a NACK to the base station. When the UE detects that no PDCCH is lost, if the physical uplink channel is not a PUSCH but a PUCCH, the bundled response information is carried on the PUCCH corresponding to the last received PDCCH and sent to the base station; if the physical uplink channel is a PUSCH, the bundled response information is carried on the PUSCH and sent to the base station.

In another embodiment of a signaling processing method according to the present invention, after step 102, the method may further include: receiving response information carried on the physical uplink channel and sent by the UE, and detecting whether the PDCCH of the downlink subframes is lost.

Specifically, when the physical uplink channel is a PUCCH, it is detected, according to whether the PUCCH is a PUCCH corresponding to the last PDCCH sent by the base station to the UE, whether the last PDCCH is lost. When the physical uplink channel is a PUSCH, it is detected, according to information about the number of downlink subframes, where the number of downlink subframes is indicated by the scrambling code added in the response information, whether the last PDCCH is lost. When the physical uplink channel is a PUCCH and no response information is received, it is detected that a PDCCH is lost.

By taking the values of the DAI shown in Table 2 and the physical uplink channel being a PUCCH as an example, if the UE receives the downlink subframes $Q_{11}, Q_{21}, Q_{12}, Q_{22}, Q_{13}$, and $Q_{23}$ that have the PDCCH, the UE may obtain that the total number $U_{DAI}$ of PDCCHs is 6, and the DAI value $V_{DAI}^{DL}$ of the last downlink subframe $Q_{23}$ is 2, so that $V_{DAI}^{DL}=(U_{DAI}-1) \bmod n+1$, and then the UE detects that no PDCCH is lost. Therefore, the UE carries the bundled response information of the six downlink subframes on the PUCCH corresponding to the PDCCH of the downlink subframe $Q_{23}$ and sends the response information to the base station. In this case, the base station may determine, through the resource for transmitting the response information, namely, transmitting the response information on the PUCCH corresponding to the PDCCH of the downlink subframe $Q_{23}$, that the UE receives all the PDCCHs. Therefore, the base station does not mistakenly determine an ACK from DTX. For another example, if the UE receives the downlink subframes $Q_{11}, Q_{21}, Q_{12}$, and $Q_{22}$, namely, the UE fails to receive the last two downlink subframes $Q_{13}$ and $Q_{23}$, the UE detects and obtains that the total number $U_{DAI}$ of PDCCHs is 4, and the DAI value $V_{DAI}^{DL}$ of the last downlink subframe $Q_{22}$ is 4. In this case, $V_{DAI}^{DL}=(U_{DAI}-1) \bmod n+1$ and the UE detects that no PDCCH is lost. Therefore, the UE carries the bundled response information of the four downlink subframes on the PUCCH corresponding to the PDCCH of the downlink subframe $Q_{22}$ and sends the response information to the base station. In this case, the base station may detect, through the resource for transmitting the response information, namely, transmitting the response information on the PUCCH corresponding to the PDCCH of the downlink subframe $Q_{22}$, that the UE does not receive all the PDCCHs. Because if the UE receives all the PDCCHs, the response information should be transmitted on the PUCCH corresponding to the PDCCH of the downlink subframe $Q_{23}$.

Moreover, the base station may further know that the UE does not receive the PDCCHs of the downlink subframes $Q_{13}$ and $Q_{23}$. In this case, even though the base station receives an ACK, the base station determines the response information of the downlink subframe $Q_{13}$ and $Q_{23}$ as the DTX rather than an ACK. Therefore, the base station does not mistakenly determine an ACK from the DTX. For another example, if the UE receives the downlink subframes $Q_{11}$, $Q_{21}$, $Q_{13}$, and $Q_{23}$, namely, the UE fails to receive the middle two downlink subframes $Q_{12}$ and $Q_{22}$, the UE detects and obtains that the total number $U_{DAI}$ of PDCCHs is 4, and the DAI value $V_{DAI}^{DL}$ of the last downlink subframe $Q_{23}$ is 2. In this case, $V_{DAI}^{DL} \neq (U_{DAI}-1) \bmod n+1$ and the UE detects that a PDCCH is lost. Therefore, the UE does not feed back response information to the base station. In this case, the base station does not receive any information from the UE, and therefore considers that the UE does not detect the sent PDCCH, and retransmits the data in the downlink subframe. Therefore, the base station does not mistakenly determine an ACK from the DTX.

If $L_{ij}$ is obtained by accumulatively counting according to the sequence of subframe first and then carrier, the value of $L_{ij}$ is mapped to the DAI value according to a certain rule, and the DAI is sent on the PDCCH. This method may also solve the problem solved by this embodiment. However, the PDCCH scheduling of each subframe changes dynamically. Therefore, the value of $L_{ij}$ calculated by this method is determined after scheduling of the current subframe. In the case of the sequence of subframe first and then carrier, whether one or multiple downlink subframes in multiple subsequent carriers have the PDCCH to be sent needs to be predicted in the current downlink subframe. That is, the scheduling of the UE to be performed in a next subframe is determined in the current subframe. This increases complexity of a scheduler and causes a great limitation on the scheduler. According to this embodiment, during the calculation of the value of $L_{ij}$, it is unnecessary to consider whether the downlink subframes after the current downlink subframe have the PDCCH to be scheduled, and therefore the complexity of the scheduler is not increased.

It may be known from the foregoing that, in this embodiment, the DAI value of the downlink subframe that has the PDCCH to be sent can indicate the number of downlink subframes, where the number of downlink subframes is obtained by accumulatively counting, according to the sequence of carrier first and then subframe, the downlink subframes which have the PDCCHs to be sent and are among the current downlink subframe in the current carrier and the downlink subframes before the current downlink subframe. In this way, no matter whether the UE detects all PDCCHs sent by the base station or the UE does not detect one or multiple PDCCHs, the base station does not mistakenly determine an ACK from the DTX, which reduces a transmission delay and improves transmission efficiency.

Figure 2:
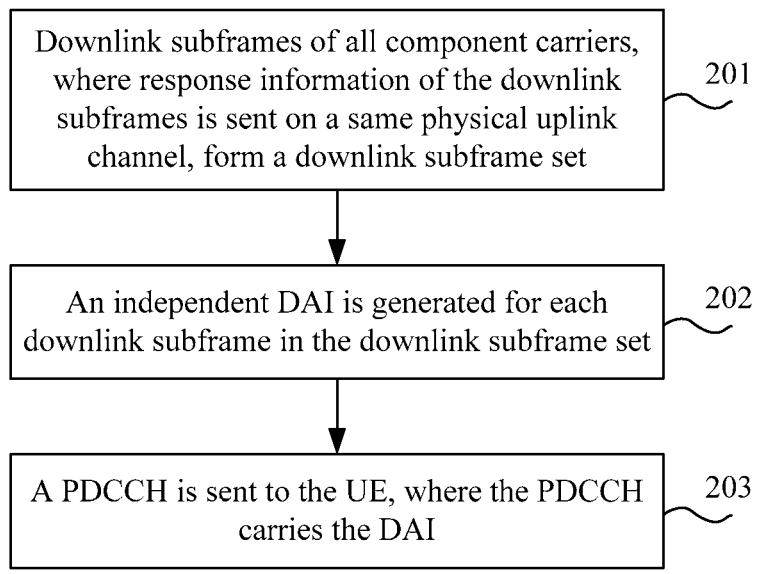
FIG. 2 is a flowchart of another embodiment of a signaling processing method according to the present invention.

FIG. 2 is a flowchart of another embodiment of a signaling processing method according to the present invention. As shown in FIG. 2, according to this embodiment, when a user equipment sends response information on multiple physical uplink channels, downlink subframes of all component carriers, where response information of the downlink subframes is sent on a same physical uplink channel, form a downlink subframe set, where an independent DAI is generated for each downlink subframe in the downlink subframe set. In this case, downlink subframes of all component carriers, where response information of the downlink subframes is sent on different physical uplink channels, form different downlink subframe sets. Specifically, the method according to this embodiment may include:

Step 201: When a user equipment sends response information on multiple physical uplink channels, downlink subframes of all component carriers, where response information of the downlink subframes is sent on a same physical uplink channel, form a downlink subframe set.

The downlink subframe set includes the downlink subframes of all component carriers, where the response information of the downlink subframes is sent on the same physical uplink channel. When different response information is sent on different physical uplink channels, multiple downlink subframe sets may be formed. The physical uplink channel includes a physical uplink control channel (PUCCH) and a physical uplink shared channel (PUSCH). In this embodiment, an example that the user equipment has two downlink subframe sets and response information of each downlink subframe set is transmitted on a physical uplink channel is taken for illustration.

Step 202: An independent DAI is generated for each downlink subframe in the downlink subframe set. In each downlink subframe set, a downlink assignment index (DAI) is generated respectively for a downlink subframe that has a PDCCH to be sent, and a value of the DAI is generated according to a preset rule and a sequence of carrier first and then subframe.

Assuming that a downlink subframe set includes downlink subframes of I component carriers, and that the $i^{th}$ component carrier has $J_i$ downlink subframes, the value of the DAI corresponding to the downlink subframe $Q_{ij}$ which has the PDCCH to be sent and is in the downlink subframes of the downlink subframe set may be obtained by mapping the number $L_{ij}$ of downlink subframes. $L_{ij}$ indicates the number of subframes, where the number of subframes is obtained by accumulatively counting, according to the sequence of carrier first and then subframe, downlink subframes which have the PDCCHs to be sent and are among the $j^{th}$ downlink subframe $Q_{ij}$ in the $i^{th}$ carrier and downlink subframes before the downlink subframe $Q_{ij}$, where $$I \geq 1,\ 1 \leq i \leq I,\ 1 \leq j \leq J_i,\ K \leq \sum_{i=1}^{I} J_i.$$

Table 3 is a value comparison table for a downlink subframe set according to this embodiment.

TABLE 3

| Component Carrier Number \ Subframe Number | 1 | 2 | 3 | 4 |
|---|---|---|---|---|
| 1 | 1 | 3 | 4 | |
| 2 | 2 | | 2 | |
| 3 | 1 | | | 3 |

As shown in Table 3, in an LTE-A system, the number of aggregated component carriers may be 3, and each component carrier has four downlink subframes, namely, there are 12 downlink subframes in total. In these 12 downlink subframes, seven downlink subframes Q, namely, $Q_{11}$, $Q_{21}$, $Q_{31}$, $Q_{12}$, $Q_{13}$, $Q_{23}$, and $Q_{34}$, have the PDCCH to be sent. In this embodiment, if the UE may simultaneously transmit K physical uplink channels, the following description is based on the example that K=2. The UE may simultaneously transmit two physical uplink channels, the base station may divide the downlink subframes in the foregoing three component carriers into two downlink subframe sets. As shown in the part enclosed by the bold lines in Table 3, the downlink subframes $Q_{11}$, $Q_{21}$, $Q_{12}$, $Q_{22}$, $Q_{13}$, and $Q_{14}$ are divided into a group to form a downlink subframe set, which may be marked as the $1^{st}$ downlink subframe set; the downlink subframes $Q_{31}$, $Q_{32}$, $Q_{23}$, $Q_{33}$, $Q_{24}$ and $Q_{34}$ are divided into a group to form another downlink subframe set, which may be marked as the $2^{nd}$ downlink subframe set. In each downlink subframe set, the value of the DAI corresponding to the downlink subframe $Q_{ij}$ that that has the PDCCH to be sent is obtained by mapping $L_{ij}$. $L_{ij}$ is obtained by accumulatively counting, according to the sequence of carrier first and then subframe, downlink subframes which have the PDCCHs to be sent and are among the downlink subframe $Q_{ij}$ and downlink subframes before the downlink subframe $Q_{ij}$. During transmission in a bundling mode, response information of the downlink subframes in the $1^{st}$ downlink subframe set is sent on one physical uplink channel; and response information of the downlink subframes in the $2^{nd}$ downlink subframe set is sent on another physical uplink channel. In the $1^{st}$ downlink subframe set, the downlink subframes that have the PDCCH to be sent are $Q_{11}$, $Q_{21}$, $Q_{12}$, and $Q_{13}$; in the $2^{nd}$ downlink subframe set, the downlink subframes that have the PDCCH to be sent are $Q_{31}$, $Q_{23}$, and $Q_{34}$. In this embodiment, the base station may map, according to a preset rule, the number of subframes into the DAI value $X^{ij}$ of the downlink subframes $Q_{11}$, $Q_{21}$, $Q_{12}$, and $Q_{13}$, where the number $L_{ij}$ of subframes is obtained by accumulatively counting, according to the sequence of carrier first and then subframe, the downlink subframes $Q_{11}$, $Q_{21}$, $Q_{12}$, and $Q_{13}$ which have the PDCCH to be sent and among the downlink subframes in the $1^{st}$ downlink subframes set, where response information of the downlink subframes in the $1^{st}$ downlink subframe set is sent on a physical uplink channel. In this case, the sequence of carrier first and then subframe may be {carrier 1 subframe 1, carrier 2 subframe 1, carrier 1 subframe 2, carrier 1 subframe 3}. That is, $L_{11}$ corresponding to the downlink subframe $Q_{11}$ is 1, $L_{21}$ corresponding to $Q_{21}$ is 2, $L_{12}$ corresponding to $Q_{12}$ is 3, and $L_{13}$ corresponding to $Q_{13}$ is 4. In this embodiment, the preset mapping rule may be $X_{ij}=(L_{ij}-1) \bmod n+1$, where $n=2^x$, and x is the number of bits of the DAI, for example, x=2. Therefore, $X_{11}$ corresponding to the downlink subframe $Q_{11}$ is 1, $X_{21}$ corresponding to $Q_{21}$ is 2, $X_{12}$ corresponding to $Q_{12}$ is 3, and $X_{13}$ corresponding to $Q_{13}$ is 4. In the $1^{st}$ downlink subframe set, other downlink subframes do not have the PDCCH; therefore, the DAI values corresponding to these downlink subframes are null. The base station may map, according to a preset rule, the number $L_{ij}$ of subframes into the DAI value $X_{ij}$ of the downlink subframes $Q_{31}$, $Q_{23}$, and $Q_{34}$, where the number $L_{ij}$ of subframes is obtained by accumulatively counting, according to the sequence of carrier first and then subframe, the downlink subframes $Q_{31}$, $Q_{23}$, and $Q_{34}$ which have the PDCCH to be sent and are among the downlink subframes $Q_{31}$, $Q_{32}$, $Q_{23}$, $Q_{33}$, $Q_{24}$ and $Q_{34}$ in the $2^{nd}$ downlink subframe set, where response information of the downlink subframes $Q_{31}$, $Q_{32}$, $Q_{23}$, $Q_{33}$, $Q_{24}$ and $Q_{34}$ in the $2^{nd}$ downlink subframe set is sent on another physical uplink channel. In this case, the sequence of carrier first and then subframe may be {carrier 3 subframe 1, carrier 2 subframe 3, carrier 3 subframe 4}. That is, $L_{31}$ corresponding to the downlink subframe $Q^{31}$ is 1, $L_{23}$ corresponding to $Q_{23}$ is 2, and $L_{34}$ corresponding to $Q_{34}$ is 3. In this embodiment, the preset rule may also be $X_{ij}=(L_{ij}-1) \bmod n+1$, where $n=2^x$, and x is the number of bits of the DAI, for example, x=2. Therefore, $X_{11}$ corresponding to the downlink subframe $Q_{11}$ is 1, $L_{31}$ corresponding to the downlink subframe $Q_{31}$ is 1, $L_{23}$ corresponding to $Q_{23}$ is 2, and $L_{34}$ corresponding to $Q_{34}$ is 3. In the $2^{nd}$ downlink subframe set, other subframes do not have the PDCCH; therefore, the DAI values for these downlink subframes are null.

In this embodiment, the value of the DAI may be generated according to any one of the foregoing three value-obtaining rules, and details are not repeatedly described here.

Step 203: A PDCCH is sent to the UE, where the PDCCH carries the DAI.

In another embodiment of a signaling processing method according to the present invention, after step 203, the method may further include: receiving response information carried on the physical uplink channel and sent by the UE, and detecting whether the PDCCH of the downlink subframes is lost. This is the same as that of the first embodiment and is not repeatedly described here.

It should be noted that the foregoing embodiment only takes the example that the number of component carriers is 2 or 3, and the number of downlink subframes in each component carrier is 4 for illustration. A person skilled in the art may understand that in the LTE-A system, more component carriers may be aggregated as required and each component carrier may also include more downlink subframes. In addition, grouping modes are not limited to the grouping mode of the three component carriers in Table 3. Implementation principles of other grouping modes are the same as that of the grouping mode shown in Table 3, and are not repeatedly described here.

It can be known from the foregoing that, in this embodiment, the DAI value of the downlink subframe that has the PDCCH to be sent can indicate the number of downlink subframes, where the number of downlink subframes is obtained by accumulatively counting, according to the sequence of carrier first and then subframe, downlink subframes which have the PDCCHs to be sent and are among the current downlink subframe in the current carrier and downlink subframes before the current downlink subframe. In this way, no matter whether the UE detects all PDCCHs sent by the base station or the UE does not detect one or multiple PDCCHs, the base station does not mistakenly determine an ACK from DTX, which reduces a transmission delay and improves transmission efficiency.

Figure 3:
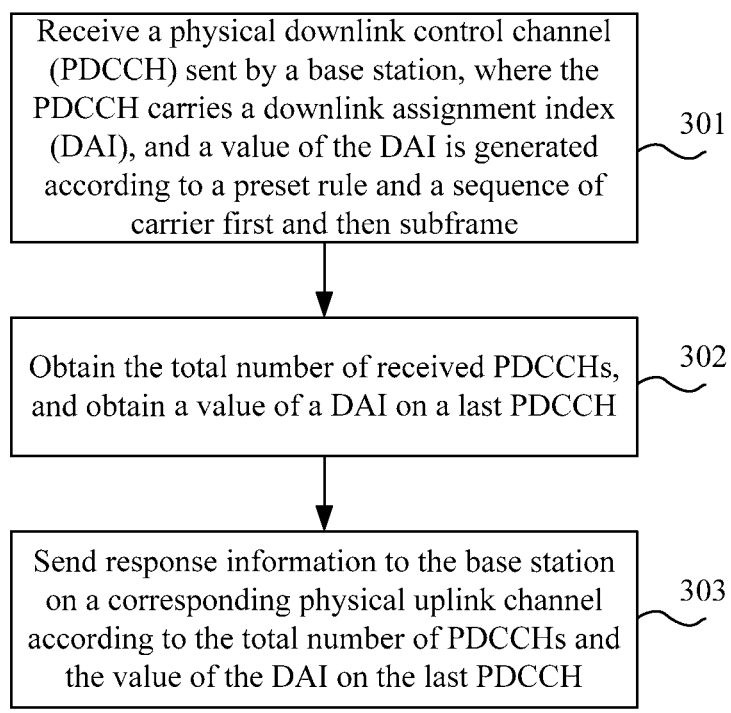
FIG. 3 is a flowchart of another embodiment of a signaling processing method according to the present invention.

FIG. 3 is a flowchart of another embodiment of a signaling processing method according to the present invention. As shown in FIG. 3, the method in this embodiment may include:

Step 301: Receive a physical downlink control channel (PDCCH) sent by a base station, where the PDCCH carries a downlink assignment index (DAI), and a value of the DAI is generated according to a preset rule and a sequence of carrier first and then subframe.

The PDCCH may be used to allocate resources for a PDSCH or indicate release of PDSCH resources allocated for downlink semi-static scheduling. A DAI is respectively generated for a downlink subframe that has a physical downlink control channel (PDCCH) to be sent in a downlink subframe set, where the value of the DAI is generated according to the preset rule and the sequence of carrier first and then subframe. The downlink subframe set may include downlink subframes of all component carriers, where response information of the downlink subframes is sent on a same physical uplink channel. The physical uplink channel may include a PUCCH or a PUSCH. The downlink subframe set may include downlink subframes of I component carriers, and the $i^{th}$ component carrier has $J_i$ downlink subframes. For example, in the downlink subframe set, a value of a DAI corresponding to the downlink subframe $Q_{ij}$ that has the PDCCH to be sent may be obtained by mapping the number $L_{ij}$ of downlink subframes. $L_{ij}$ indicates the number of subframes, where the number of subframes is obtained by accumulatively counting, according to the sequence of carrier first and then subframe, downlink subframes which have the PDCCHs to be sent and are among the $j^{th}$ downlink subframe $Q_{ij}$ in the $i^{th}$ carrier and downlink subframes before the downlink subframe $Q_{ij}$, where $$I \geq 1, 1 \leq i \leq I, 1 \leq j \leq J_i, K \leq \sum_{i=1}^{I} J_i.$$

As shown in Table 2, in an LTE-A system, the number of aggregated component carriers is 2, and each component carrier has four downlink subframes, namely, a corresponding downlink subframe set includes eight downlink subframes. During transmission by using a bundling mode, response information of the downlink subframes in two component carriers is transmitted on a same physical uplink channel. In the downlink subframe set, six downlink subframes Q, namely, $Q_{11}$, $Q_{21}$, $Q_{12}$, $Q_{22}$, $Q_{13}$, and $Q_{23}$, have the PDCCH to be sent. The PDCCH is used to allocate resources to the PDSCH or indicate release of the PDSCH resources allocated for downlink semi-static scheduling. During transmission by using the bundling mode, the value of the DAI of the downlink subframe that have the PDCCH to be sent needs to be determined. In this embodiment, the base station may map, according to a preset rule, the number $L_{ij}$ of subframes into the DAI value $X_{ij}$ of the downlink subframe $Q_{ij}$, where $1 \leq i \leq 2$, $1 \leq j \leq 4$, and the number $L_{ij}$ of subframes is obtained by accumulatively counting, according to the sequence of carrier first and then subframe, downlink subframes which have the PDCCHs to be sent and are among the downlink subframes whose response information is sent on the PUCCH. In this embodiment, the sequence of first carrier and then subframe may be {carrier 1 subframe 1, carrier 2 subframe 1, carrier 1 subframe 2, carrier 2 subframe 2, carrier 1 subframe 3, carrier 2 subframe 3, carrier 1 subframe 4, carrier 2 subframe 4}. The downlink subframes that have the PDCCH to be sent may be in a sequence of {carrier 1 subframe 1, carrier 2 subframe 1, carrier 1 subframe 2, carrier 2 subframe 2, carrier 1 subframe 3, carrier 2 subframe 3}, namely, corresponding to $Q_{11}$, $Q_{21}$, $Q_{12}$, $Q_{22}$, $Q_{13}$, and $Q_{23}$. $L_{11}$ corresponding to $Q_{11}$ is 1, $L_{21}$ corresponding to $Q_{21}$ is 2, $L_{12}$ corresponding is $Q_{13}$ is 3, $L_{22}$ corresponding to $Q_{22}$ is 4, $L_{13}$ corresponding to $Q_{13}$ is 5, and $L_{23}$ corresponding to $Q_{23}$ is 6. In this embodiment, the preset rule may be $X_{ij}=(L_{ij}-1) \bmod n+1$, where $n=2^x$, and x is the number of bits of the DAI, for example x=2. Therefore, the DAI value for $Q_{11}$ is 1, the DAI value for $Q_{21}$ is 2, the DAI value for $Q_{12}$ is 3, the DAI value for $Q_{22}$ is 4, the DAI value $Q_{13}$ is 1, and the DAI value for $Q_{23}$ is 2.

As shown in Table 3, in an LTE-A system, the number of aggregated component carriers may be 3, and each component carrier has four downlink subframes, namely, there are 12 downlink subframes in total. In the 12 downlink subframes, seven downlink subframes Q, namely, $Q_{21}$, $Q_{31}$, $Q_{12}$, $Q_{13}$, $Q_{23}$, and $Q_{34}$, have the PDCCH to be sent. In this embodiment, if the UE may simultaneously transmit K physical uplink channels, the following description is based on the example that K=2. The UE may simultaneously transmit two physical uplink channels, the base station may divide the downlink subframes in the foregoing three component carriers into two downlink subframe sets. As shown in the part enclosed by the bold lines in Table 3, the downlink subframes $Q_{11}$, $Q_{21}$, $Q_{12}$, $Q_{22}$, $Q_{13}$, and $Q_{14}$ are divided into a group to form a downlink subframe set, which may be marked as the $1^{st}$ downlink subframe set; the downlink subframes $Q_{31}$, $Q_{32}$, $Q_{23}$, $Q_{33}$, $Q_{24}$ and $Q_{34}$ are divided into a group to form another downlink subframe set, which may be marked as the $2^{nd}$ downlink subframe set. In each downlink subframe set, the value of the DAI corresponding to the downlink subframe $Q_{ij}$ that that has the PDCCH to be sent is obtained by mapping $L_{ij}$. $L_{ij}$ is obtained by accumulatively counting, according to the sequence of carrier first and then subframe, downlink subframes which have the PDCCHs to be sent and are among the downlink subframe $Q_{ij}$ and downlink subframes before the downlink subframe $Q_{ij}$. During transmission in a bundling mode, response information of the downlink subframes in the $1^{st}$ downlink subframe set is sent on one physical uplink channel; and response information of the downlink subframes in the $2^{nd}$ downlink subframe set is sent on another physical uplink channel. In the $1^{st}$ downlink subframe set, the downlink subframes that have the PDCCH to be sent are $Q_{11}$, $Q_{21}$, $Q_{12}$, and $Q_{13}$; in the $2^{nd}$ downlink subframe set, the downlink subframes that have the PDCCH to be sent are $Q_{31}$, $Q_{23}$, and $Q_{34}$. In this embodiment, the base station may map, according to a preset rule, the number $L_{ij}$ of subframes into the DAI value $X_{ij}$ of the downlink subframes $Q_{11}$, $Q_{21}$, $Q_{12}$, and $Q_{13}$ where the number $L_{ij}$ of subframes is obtained by accumulatively counting, according to the sequence of carrier first and then subframe, the downlink subframes $Q_{11}$, $Q_{21}$, $Q_{12}$, and $Q_{13}$ which have the PDCCH to be sent and among the downlink subframes in the $1^{st}$ downlink subframe set, where response information of the downlink subframes in the $1^{st}$ downlink subframe set is sent on the same physical uplink channel. In this case, the sequence of carrier first and then subframe may be {carrier 1 subframe 1, carrier 2 subframe 1, carrier 1 subframe 2, carrier 1 subframe 3}. That is, $L_{11}$ corresponding to the downlink subframe $Q_{11}$ is 1, $L_{21}$ corresponding to $Q_{21}$ is 2, $L_{12}$ corresponding to $Q_{12}$ is 3, and $L_{13}$ corresponding to $Q_{13}$ is 4. In this embodiment, the preset rule may be $X=(L_{ij}-1) \bmod n+1$, where $n=2^x$, and x is the number of bits of the DAI, for example, x=2. Therefore, $X_{11}$ corresponding to the downlink subframe $Q_{11}$ is 1, $X_{21}$ corresponding to $Q_{21}$ is 2, $X_{12}$ corresponding to $Q_{12}$ is 3, and $X_{13}$ corresponding to $Q_{13}$ is 4. In the $1^{st}$ downlink subframe set, other downlink subframes do not have the PDCCH; therefore, the DAI values corresponding to these downlink subframes are null. The base station may map, according to a preset rule, the number $L_{ij}$ of subframes into the DAI value $X_{ij}$ of the downlink subframes $Q_{31}$, $Q_{23}$, and $Q_{34}$, where the number $L_{ij}$ of subframes is obtained by accumulatively counting, according to the sequence of carrier first and then subframe, the downlink subframes $Q_{31}$, $Q_{23}$, and $Q_{34}$ which have the PDCCH to be sent and are among the downlink subframes in the $2^{nd}$ downlink subframe set, where response information of the downlink subframes in the $2^{nd}$ downlink subframe set is sent on another physical uplink channel. In this case, the sequence of carrier first and then subframe may be {carrier 3 subframe 1, carrier 2 subframe 3, carrier 3 subframe 4}. That is, $L_{31}$ corresponding to the downlink subframe $Q_{31}$ is 1, $L_{23}$ corresponding to $Q_{23}$ is 2, and $L_{34}$ corresponding to $Q_{34}$ is 3. In this embodiment, the preset rule may be $X_{ij}=(L_{ij}-1) \bmod n+1$, where $n=2^x$, and x is the number of bits of the DAI, for example, x=2. Therefore, $X_{11}$ corresponding to the downlink subframe $Q_{11}$ is 1, $L_{31}$ corresponding to the downlink subframe $Q_{31}$ is 1, $L_{23}$ corresponding to $Q_{23}$ is 2, and $L_{34}$ corresponding to $Q_{34}$ is 3. In the $2^{nd}$ downlink subframe set, other subframes do not have the PDCCH; therefore, the DAI values for these downlink subframes are null.

In this embodiment, the value of the DAI may be generated according to any one of the three value-obtaining rules described in the first embodiment, and details are not repeatedly described here.

Step 302: Obtain the total number $U_{DAI}$ of received PDCCHs, and obtain the value $V_{DAI}^{DL}$ of the DAI on the last PDCCH among the received PDCCHs.

The UE may receive the PDCCH sent by the base station, and accumulatively count the received PDCCHs to obtain the total number $U_{DAI}$ of PDCCHs. In addition, the UE may obtain the value $V_{DAI}^{DL}$ of the DAI on the last PDCCH among the received PDCCHs.

Step 303: Send response information to the base station on a corresponding physical uplink channel according to the total number $U_{DAI}$ of PDCCHs and the value $V_{DAI}^{DL}$ of the DAI on the last PDCCH.

The UE may detect, according to values of $V_{DAI}^{DL}$ and $U_{DAI}$, whether a PDCCH is lost during receiving of the PDCCHs, and feeds back response information to the base station according to a detection result. Specifically, if $U_{DAI}$ is greater than 0 and different from the number of subframes indicated by $V_{DAI}^{DL}$, namely, $U_{DAI}>0$ and $V_{DAI}^{DL} \neq (U_{DAI}-1) \bmod n+1$, the UE detects that at least one PDCCH of the downlink subframes is lost; if $U_{DAI}$ is greater than 0 and equal to the number of subframes indicated by $V_{DAI}^{DL}$, namely, $U_{DAI}>0$ and $V_{DAI}^{DL}=(U_{DAI}-1) \bmod n+1$, the UE detects that no PDCCH is lost. When the UE detects that at least one PDCCH of the downlink subframes is lost, if the physical uplink channel is not a PUSCH but a PUCCH, the UE does not feed back response information to the base station; if the physical uplink channel is a PUSCH, the UE feeds back a NACK to the base station. When the UE detects that no PDCCH is lost, if the physical uplink channel is not a PUSCH but a PUCCH, bundled response information is carried on the PUCCH corresponding to the last received PDCCH and sent to the base station; if the physical uplink channel is a PUSCH, bundled response information is carried on the PUSCH and sent to the base station.

Figure 4:
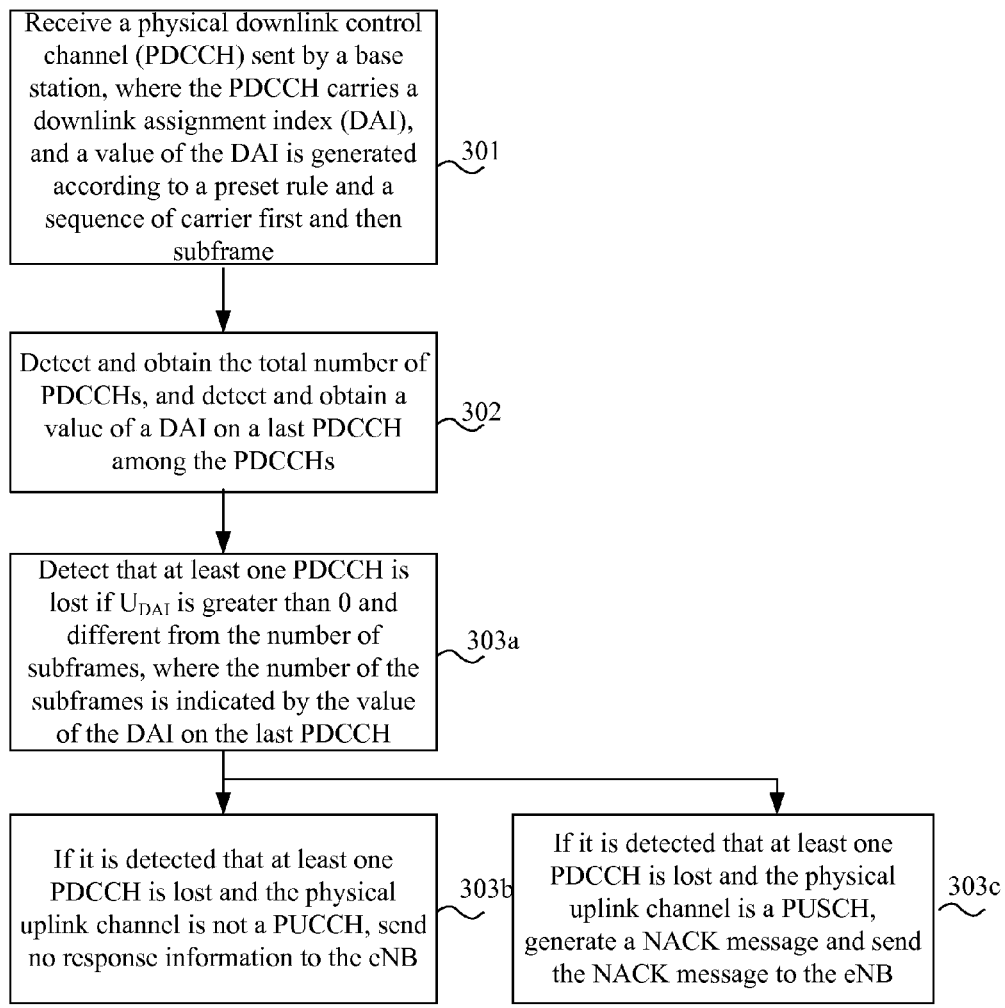
FIG. 4 is a flowchart of another embodiment of a signaling processing method according to the present invention.

FIG. 4 is a flowchart of another embodiment of a signaling processing method according to the present invention. As shown in FIG. 4, on the basis of the method shown in FIG. 3, step 303 in the method in this embodiment may further include:

Step 303a: Detect that at least one PDCCH is lost if $U_{DAI}$ is greater than 0 and different from the number of subframes indicated by $V_{DAI}^{DL}$.

Step 303b: If it is detected that at least one PDCCH is lost and the physical uplink channel is not a PUSCH, send no response information to the base station.

Step 303c: If it is detected that at least one PDCCH is lost and the physical uplink channel is a PUSCH, generate a NACK message and send the NACK message to the base station.

By taking the values of the DAI shown in Table 2 and the physical uplink channel being a PUCCH as an example, if the UE receives the downlink subframes $Q_{11}$, $Q_{21}$, $Q_{12}$, $Q_{22}$, $Q_{13}$, and $Q_{23}$, the UE may obtain that the total number $U_{DAI}$ of received PDCCHs is 6, and the DAI value $V_{DAI}^{DL}$ of the last received PDCCH is 2, so that $V_{DAI}^{DL}=(U_{DAI}-1) \bmod n+1$, and then the UE detects that no PDCCH is lost. Therefore, the UE carries the bundled response information of the six downlink subframes on the PUCCH corresponding to the PDCCH of the downlink subframe $Q_{23}$ and sends the response information to the base station. In this case, the base station may determine, through the resource for transmitting the response information, namely, transmitting the response information on the PUCCH corresponding to the PDCCH of the downlink subframe $Q_{23}$, that the UE receives all the PDCCHs. Therefore, the base station does not mistakenly determine an ACK from DTX, and upper-layer retransmission is not required. For another example, if the UE receives the downlink subframes $Q_{11}$, $Q_{21}$, $Q_{12}$, and $Q_{22}$, namely, the UE fails to receive the last two downlink subframes $Q_{13}$ and $Q_{23}$, the UE obtains that the total number $U_{DAI}$ of received PDCCHs is 4, and the DAI value $V_{DAI}^{DL}$ of the last received PDCCH is 4. In this case, $V_{DAI}^{DL}=(U_{DAI}-1) \bmod n+1$ and the UE detects that no PDCCH is lost. Therefore, the UE carries the bundled response information of the four downlink subframes on the PUCCH corresponding to the PDCCH of the downlink subframe $Q_{22}$ and sends the response information to the base station. In this case, the base station may judge, through the resource for transmitting the response information, namely, transmitting the response information on the PUCCH corresponding to the PDCCH of the downlink subframe $Q_{22}$, that the UE does not receive all the PDCCHs. Because if the UE receives all the PDCCHs, the response information should be transmitted on the PUCCH corresponding to the PDCCH of the downlink subframe $Q_{23}$, and the base station may further know that the UE does not receive the PDCCHs of the downlink subframes $Q_{13}$ and $Q_{23}$. In this case, even though the base station receives an ACK, the base station determines the response information of the downlink subframe $Q_{13}$ and $Q_{23}$ as the DTX rather than an ACK. Therefore, the base station does not mistakenly determine an ACK from the DTX. For another example, if the UE receives the downlink subframes $Q_{11}$, $Q_{21}$, $Q_{13}$, and $Q_{23}$, namely, the UE fails to receive the middle two downlink subframes $Q_{12}$ and $Q_{22}$, the UE obtains that the total number $U_{DAI}$ of received PDCCHs is 4, and the DAI value $V_{DAI}^{DL}$ of the last received PDCCH is 2. In this case, $V_{DAI}^{DL} \neq (U_{DAI}-1) \bmod n+1$ and the UE detects that a PDCCH is lost. Therefore, the UE does not feed back response information to the base station. In this case, the base station does not receive any information from the UE, and therefore considers that the UE does not detect the sent PDCCH, and retransmits the data in the downlink subframe. Therefore, the base station does not mistakenly determine an ACK from the DTX.

In this embodiment, when the response information is sent to the base station on multiple physical unlink channels, for different downlink subframes whose response information is sent on different physical unlink channels, the obtaining the $U_{DAI}$ and the $V_{DAI}^{DL}$ and sending the response information to the base station are performed respectively for each downlink subframe set.

In the foregoing embodiment of the signaling processing method according to the present invention, the DAI value of the downlink subframe that has the PDCCH to be sent can indicate the number of downlink subframes, where the number of downlink subframes is obtained by accumulatively counting, according to the sequence of carrier first and then subframe, downlink subframes which have the PDCCHs to be sent and are among the current downlink subframe in the current carrier and downlink subframes before the current downlink subframe. In this way, no matter whether the UE detects all PDCCHs sent by the base station or the UE does not detect one or multiple PDCCHs, the base station does not mistakenly determine an ACK from the DTX, which reduces a transmission delay and improves transmission efficiency.

Figure 5:
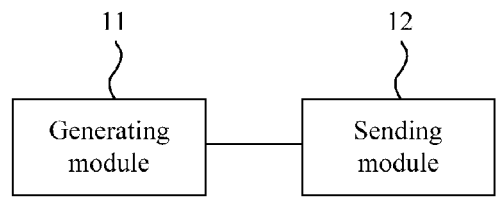
FIG. 5 is a schematic structural diagram of an embodiment of a base station according to the present invention.

FIG. 5 is a schematic structural diagram of an embodiment of a base station according to the present invention. As shown in FIG. 5, the base station in this embodiment includes: a generating module 11 and a sending module 12. The generating module 11 is configured to generate, in a downlink subframe set, a downlink assignment index (DAI) respectively for a downlink subframe that has a physical downlink control channel (PDCCH) to be sent, where a value of the DAI is generated according to a preset rule and a sequence of carrier first and then subframe. The sending module 12 is configured to send the PDCCH to a user equipment, where the PDCCH carries the DAI.

The downlink subframe set includes downlink subframes of all component carriers, where response information of the downlink subframes is sent on a same physical uplink channel.

Implementation principles of the base station according to this embodiment is the same as that of the signaling processing method embodiment shown in FIG. 1, and are not repeatedly described here.

In another embodiment of the base station according to the present invention, when the use equipment sends response information on multiple physical uplink channels, the downlink subframes of all the component carriers, where the response information of the downlink subframes is sent on the same physical uplink channel, form a downlink subframe set, and the generating module generates an independent DAI for each downlink subframe in the downlink subframe set.

Implementation principles of the base station according to this embodiment is the same as that of the signaling processing method embodiment shown in FIG. 2, and are not repeatedly described here.

In the base station according to the foregoing embodiment, the DAI value of the downlink subframe that has the PDCCH to be sent can indicate the number of downlink subframes, where the number of downlink subframes is obtained by accumulatively counting, according to the sequence of carrier first and then subframe, the downlink subframes which have the PDCCHs to be sent and are among the current downlink subframe and the downlink subframes before the current downlink subframe. In this way, no matter whether the UE detects all PDCCHs sent by the base station or the UE does not detect one or multiple PDCCHs, the base station does not mistakenly determine an ACK from DTX, which reduces a transmission delay and improves transmission efficiency.

Figure 6:
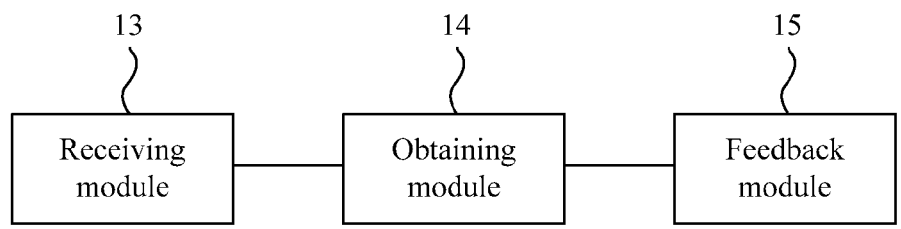
FIG. 6 is a schematic structural diagram of an embodiment of a user equipment according to the present invention.

FIG. 6 is a schematic structural diagram of an embodiment of a user equipment according to the present invention. As shown in FIG. 6, the user equipment in this embodiment may include: a receiving module 13, an obtaining module 14, and a feedback module 15. The receiving module 13 is configured to receive a physical downlink control channel (PDCCH) sent by a base station, where the PDCCH carries a downlink assignment index (DAI), and a value of the DAI is generated according to a preset rule and a sequence of carrier first and then subframe. The obtaining module 14 is configured to obtain the total number $U_{DAI}$ of received PDCCHs, and obtain a value $V_{DAI}^{DL}$ of a DAI on a last PDCCH among the received PDCCHs. The feedback module 15 is configured to send response information to the base station on a corresponding physical uplink channel according to the total number $U_{DAI}$ of PDCCHs and the value $V_{DAI}^{DL}$ of the DAI on the last PDCCH.

Implementation principles of the UE according to this embodiment is the same as that of the signaling processing method embodiment shown in FIG. 3, and are not repeatedly described here.

Figure 7:
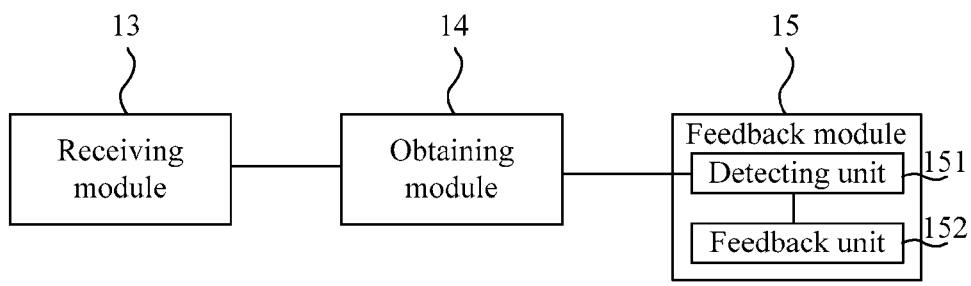
FIG. 7 is a schematic structural diagram of another embodiment of a user equipment according to the present invention.

FIG. 7 is a schematic structural diagram of another embodiment of a user equipment according to the present invention. As shown in FIG. 7, on the basis of the user equipment shown in FIG. 6, the feedback module 15 in this embodiment may include: a detecting unit 151 and a feedback unit 152. The detecting unit 151 is configured to detect that at least one PDCCH is lost if $U^{DAI}$ is greater than 0 and is different from the number of subframes indicated by $V_{DAI}^{DL}$. The feedback unit 152 is configured to, when the detecting unit detects that at least one PDCCH is lost, send no response information to the base station if the physical uplink channel is not a PUSCH; and generate a NACK message and send the NACK message to the base station if the physical uplink channel is the PUSCH.

Implementation principles of the user equipment according to this embodiment is the same as that of the signaling processing method embodiment shown in FIG. 4, and are not repeatedly described here.

In the user equipment according to the foregoing embodiment, the DAI value of the downlink subframe that has the PDCCH to be sent can indicate the number of downlink subframes, where the number of downlink subframes is obtained by accumulatively counting, according to the sequence of carrier first and then subframe, the downlink subframes which have the PDCCHs to be sent and are among the current downlink subframe and the downlink subframes before the current downlink subframe. In this way, no matter whether the UE detects all PDCCHs sent by the base station or the UE does not detect one or multiple PDCCHs, the base station does not mistakenly determine an ACK from DTX, which reduces a transmission delay and improves transmission efficiency.

Finally, it should be noted that the foregoing embodiments are used to describe the technical solutions of the present invention only, but are not intended to limit the technical solutions of the present invention. Although the present invention is described in detail by referring to the exemplary embodiments, persons of ordinary skill in the art should understand that various modifications or equivalent replacements may still be made to the technical solutions of the present invention; however, these modifications and equivalent replacements cannot make the modified technical solutions depart from the spirit and protection scope of the technical solutions of the present invention.

What is claimed is:

1. A signaling processing method, comprising:
in a downlink subframe set, generating, by a base station, a downlink assignment index (DAI) respectively for each downlink subframe that has a physical downlink control channel (PDCCH) to be sent in a current carrier, wherein a value of the DAI is generated by the following:
counting downlink subframes having PDCCHs not yet sent, wherein the downlink subframes are in a group consisting of a current downlink subframe and previous downlink subframes in the current carrier, and
setting, the last two downlink subframes that have the PDCCHs to be sent with a same DAI value; and
sending, by the base station, the PDCCH to a user equipment, wherein the PDCCH carries the DAI.

2. The signaling processing method according to claim 1, wherein the PDCCH is used to allocate resources to a physical downlink shared channel (PDSCH), or indicate release of PDSCH resources allocated for downlink semi-static scheduling.

3. The signaling processing method according to claim 1, wherein the downlink subframe set comprises downlink subframes in all component carriers, wherein response information of the downlink subframes is sent on a same physical uplink channel.

4. The signaling processing method according to claim 3, wherein when the user equipment sends response information on multiple physical uplink channels, the base station forms a downlink subframe set by using the downlink subframes in all the component carriers, wherein the response information of the downlink subframes is sent on the same physical uplink channel, and an independent DAI is generated for each downlink subframe in the downlink subframe set.

5. The signaling processing method according to claim 1, wherein the preset rule comprises:
    obtaining the DAI of a current downlink subframe by accumulatively counting downlink subframes which have the PDCCHs to be sent and are among the current downlink subframe in a current carrier and downlink subframes before the current downlink subframe.

6. The signaling processing method according to claim 1, wherein the preset rule comprises:
    obtaining the DAI of a current downlink subframe by accumulatively counting downlink subframes which have the PDCCHs to be sent and are in all carriers at the time of the current and previous downlink subframes.

7. The signaling processing method according to claim 1, upon sending the PDCCH to the user equipment, the method further comprising:
    receiving, response information sent from the user equipment, on a Physical Uplink Control Channel (PUCCH) corresponding to the PDCCH of a last downlink subframe of the downlink subframe set;
    determining, based on the PUCCH through which the response information has been sent, whether the user equipment has received all PDCCHs each of which corresponds to the each downlink subframe.

8. A signaling processing method, comprising:
    receiving, by a user equipment (UE), a physical downlink control channel (PDCCH) sent by a base station, wherein the PDCCH carries a downlink assignment index (DAD, and a value of the DAI is generated and provided by the base station according to the following: counting downlink subframes having PDCCHs not yet sent, wherein the downlink subframes are in a group consisting of a current downlink subframe and previous downlink subframes in the current carrier and setting the last two downlink subframes that have the PDCCHs to be sent with a same DAI value;
    obtaining, by the UE, the total number $U_{DAI}$ of received PDCCHs by accumulatively counting the received PDCCHs and obtaining a value $V_{DAI}^{DL}$ of a DAI on a last PDCCH among the received PDCCHs; and
    sending, by the UE, response information to the base station on a physical uplink channel corresponding to the UE according to the total number $U_{DAI}$ of PDCCHs and the value $V_{DAI}^{DL}$ of the DAI on the last PDCCH.

9. The signaling processing method according to claim 8, the method further comprising:
    detecting that at least one PDCCH is lost if $U_{DAI}$ is greater than 0 and different from the number of subframes indicated by $V_{DAI}^{DL}$.

10. The signaling processing method according to claim 9, the method further comprising:
    if it is detected that at least one PDCCH is lost and the physical uplink channel is a PUCCH, sending no response information to the base station; and
    if it is detected that at least one PDCCH is lost and the physical uplink channel is a PUSCH, generating a NACK message and sending the NACK message to the base station.

11. A Base Station, comprising:
    a generating module, configured to generate, in a downlink subframe set, a downlink assignment index (DAI) respectively for each downlink subframe that has a physical downlink control channel (PDCCH) to be sent in a current carrier, wherein a value of the DAI is generated by the following:
    counting downlink subframes having PDCCHs not yet sent, wherein the downlink subframes are in a group consisting of a current downlink subframe and previous downlink subframes in the current carrier, and
    setting, the last two downlink subframes that have the PDCCHs to be sent with a same DAI value; and
    a transmitter, configured to send the PDCCH to a user equipment (UE), wherein the PDCCH carries the DAI generated by the generating module.

12. The base station according to claim 11, wherein the downlink subframe set comprises downlink subframes in all component carriers, wherein response information of the downlink subframes is sent on a same physical uplink channel; and when the user equipment sends response information on multiple physical uplink channels, the base station forms a downlink subframe set by using the downlink subframes in all the component carriers, wherein the response information of the downlink subframes is sent on the same physical uplink channel, and the generating module generates an independent DAI for each downlink subframe in the downlink subframe set.

13. The base station according to claim 11, wherein the preset rule comprises:
    obtaining the DAI of a current downlink subframe by accumulatively counting downlink subframes which have the PDCCHs to be sent and are among the current downlink subframe in a current carrier and downlink subframes before the current downlink subframe.

14. The base station according to claim 11, wherein the preset rule comprises:
    obtaining the DAI of a current downlink subframe by accumulatively counting downlink subframes which have the PDCCHs to be sent and are in all carriers at the time of the current and previous downlink subframes.

15. The base station according to claim 11, wherein the transmitter is further configured to: upon sending the PDCCH to the user equipment, receive, response information sent from the user equipment, on a Physical Uplink Control Channel (PUCCH) corresponding to the PDCCH of a last downlink subframe of the downlink subframe set; and
    the generating module is further configured to determine, based on the PUCCH through which the response information has been sent, whether the user equipment has received all PDCCHs each of which corresponds to the each downlink subframe.

16. A user equipment (UE), comprising:
    a receiver, configured to receive a physical downlink control channel (PDCCH) sent by a base station, wherein the PDCCH carries a downlink assignment index (DAI), and a value of the DAI is generated and provided by the base station according to the following: counting downlink subframes having PDCCHs not yet sent, wherein the downlink subframes are in a group consisting of a current downlink subframe and previous downlink subframes in the current carrier, and setting, the last two downlink subframes that have the PDCCHs to be sent with a same DAI value;
    an obtaining module, configured to obtain the total number $U_{DAI}$ of PDCCHs received by the receiver by accumulatively counting the received PDCCHs, and obtain a value $V_{DAI}^{DL}$ of a DAI on a last PDCCH among the PDCCHs received by the receiving module; and
    a feedback module, configured to send response information to the base station on a corresponding physical uplink channel according to the total number $U^{DAI}$ of the PDCCHs and the value $V_{DAI}^{DL}$ of the DAI on the last PDCCH, wherein the total number $U_{DAI}$ of the PDCCHs and the value $V_{DAI}^{DL}$ of the DAI on the last PDCCH are obtained by the obtaining module.

17. The user equipment according to claim 16, wherein the feedback module comprises:
 a detecting unit, configured to detect that at least one PDCCH is lost if $U_{DAI}$ is greater than 0 and different from the number of subframes indicated by $V_{DAI}^{DL}$; and
 a feedback unit, configured to, when the detecting unit detects that at least one PDCCH is lost, send no response information to the base station if the physical uplink channel is not a PUSCH, and generate a NACK message and send the NACK message to the base station if the physical uplink channel is the PUSCH.

18. A computer program product, comprising a non-transitory computer-readable medium, which encoded thereon computer program code, which, when executed by a computer unit, will cause the computer unit to perform the steps of a user terminal according to claim 1.

\* \* \* \* \*